(12) United States Patent
Bowler et al.

(10) Patent No.: US 12,294,818 B2
(45) Date of Patent: May 6, 2025

(54) MULTI-RATE AND MULTI-MODULATION ONT AND OLT

(71) Applicant: ARRIS Enterprises LLC, Horsham, PA (US)

(72) Inventors: David Bowler, Stow, MA (US); Bruce C. Pratt, Bedford, NH (US); John Charles Chamberlain, Hickory, NC (US); Erik J. Gronvall, Bloomington, MN (US)

(73) Assignee: ARRIS Enterprises LLC, Horsham, PA (US)

( * ) Notice: Subject to any disclaimer, the term of this patent is extended or adjusted under 35 U.S.C. 154(b) by 0 days.

(21) Appl. No.: 18/294,107

(22) PCT Filed: Apr. 13, 2023

(86) PCT No.: PCT/US2023/018545
§ 371 (c)(1),
(2) Date: Jan. 31, 2024

(87) PCT Pub. No.: WO2023/215088
PCT Pub. Date: Nov. 9, 2023

(65) Prior Publication Data
US 2025/0063277 A1   Feb. 20, 2025

Related U.S. Application Data

(60) Provisional application No. 63/338,407, filed on May 4, 2022.

(51) Int. Cl.
*H04B 10/60* (2013.01)
*H04Q 11/00* (2006.01)

(52) U.S. Cl.
CPC ......... *H04Q 11/0067* (2013.01); *H04B 10/60* (2013.01)

(58) Field of Classification Search
CPC .............................. H04B 10/60; H04Q 11/006
See application file for complete search history.

(56) References Cited

U.S. PATENT DOCUMENTS

| | | | |
|---|---|---|---|
| 7,092,644 B2 * | 8/2006 | Davidson | H04B 10/6933 398/213 |
| 8,896,351 B2 * | 11/2014 | Wenske | H04L 25/0264 327/108 |
| 10,103,814 B2 | 10/2018 | Funada et al. | |
| 2008/0159756 A1 * | 7/2008 | Cheng | H04B 10/693 330/308 |
| 2009/0245807 A1 | 10/2009 | Nomura | |
| 2022/0076716 A1 * | 3/2022 | Um | G11C 7/1057 |
| 2023/0080051 A1 * | 3/2023 | Sun | H04L 12/5601 398/43 |

FOREIGN PATENT DOCUMENTS

WO   2008083291 A1   7/2008

OTHER PUBLICATIONS

International Search Report and Written Opinion RE: Application No. PCT/US2023/018545, dated Sep. 18, 2023.

* cited by examiner

*Primary Examiner* — Tanya T Motsinger
(74) *Attorney, Agent, or Firm* — Chernoff, Vilahuer, McClung & Stenzel, LLP

(57) ABSTRACT

An optical network unit may include a light sensitive unit suitable for receiving NRZ and/or PAM signals effectively. The optical network unit may include a laser transmission unit for providing NRZ and/or PAM signals effectively.

1 Claim, 11 Drawing Sheets

MULTI-RATE AND MULTI-MODULATION ONT AND OLT

CROSS REFERENCE TO RELATED APPLICATIONS

This application is a 371 National Stage Patent application claiming priority to PCT. International Patent Application No. PCT/US23/18545, which claims the benefit of U.S. Provisional Patent Application Ser. No. 63/338,407 filed May 4, 2022.

BACKGROUND

The subject matter of this application relates to optical network components.

Many telecommunications networks include Passive Optical Networks ("PONs"). In PONs, generally most to all components which require power ("active components"), e.g., repeaters, relays, memory chips, processors, between the Central Office exchange and termination points at the customer premises are eliminated, and passive optical components are put into the network to guide traffic based on splitting the power of optical wavelengths to endpoints along the way. The passive splitters or couplers are devices working to pass or restrict light, and as such, have no power or processing requirements thereby lowering overall maintenance costs for the service provider.

FIG. 1 shows a typical PON 100 for an optical access architecture. The PON 100 includes an optical line terminator ("OLT") 110 located at a Central Office ("CO") and a set of optical network units ("ONU") 120, or optical network terminals, located at the customer premise. Each of the ONUs 120 is connected to the OLT 110 through feeder fiber 130, e.g., an outside fiber plant, optical power splitter 140, and individual distribution fibers 150. The feeder fiber 130 may transmit optical signals at 125 Megabits per second ("Mbps"), 155 Mbps, 622 Mbps, 1.25 Gigabits per second ("Gbps"), 2.5 Gbps, 10 Gbps, or 50 Gbps, or otherwise, in accordance with standards used for various access platforms. Various access platforms, including various transmission formats, and communication and control protocols, e.g., Ethernet based PON ("EPON"), Broadband PON ("BPON"), Gigabit PON ("GPON"), and ATM based PON ("APON"), have been developed to deliver information, e.g., data, voice, and video, from the Central Office to each of the customer premises.

Access platforms, e.g., EPON, BPON, or GPON, use light having a wavelength of 1.49 microns ("um"), or otherwise, to transmit information in downstream 160 direction and light having the wavelength of 1.31 um, or otherwise, to transmit information in upstream 170 direction between the Central Office and the customer premises. The OLT 110 contains a high power distributed feedback ("DFB") laser to produce the light at 1.49 um in downstream 160 direction, which is shared by a plurality, e.g., 16, 32, or more of ONUs 120.

For example, BPON (ITU-T G.983 (01/2005) "Broadband optical access systems based on Passive Optical Networks (PON)", incorporated by reference herein) operates at generally 155/622/1200 Mbps downstream and 155/622/1200/2500 Mbps upstream, with laser wavelength of 1490 downstream and laser wavelength of 1310 nm upstream. BPON transmits downstream in a broadcast manner and upstream in a time division multiple access manner.

For example, GPON (ITU-T G.984.1 (03/2008) "Gigabit-capable passive optical networks (GPON): General characteristics", incorporated by reference herein) operates at generally 155 Mbps/622 Mbps/1.2 Gbps/2.5 Gbps downstream and 1.244 Gb/s upstream, with laser wavelength of 1490 nm downstream and laser wavelength of 1310 nm upstream. GPON transmits downstream in a broadcast manner and upstream in a time division multiple access manner.

The OLT 110 may service the plurality of ONUs 120 through the use of one or more optical power splitters 140 and access platform PON protocols to control the sending and transmission of signal across the shared access facility. Data may be transmitted downstream 160 from OLT 110 to each of ONU 120, and each ONU 120 processes the data destined to it by matching the address at the access protocol transmission unit header. Upstream 170 data from each of the ONUs 120 to the OLT 110 is transmitted according to access control mechanisms and protocols in the OLT 110, which include a time division multiplexing scheme, in which dedicated transmission time slots are granted to each individual ONU 120, to avoid data collision. As such, transport of information between the Central Office and customer premises depends on the type of the access platform used by the Central Office and customer premises. Further, each OLT 110 at the Central Office requires its own feeder fiber 130 to provide data transmission to and from the plurality of ONUs 120. In addition, a timing algorithm may be used in existing access platforms, which limits the distance between the OLT 110 and the ONU 120.

In this manner, depending on the particular architecture implemented, the OLT and/or the ONUs are configured to include the appropriate lasers together with the appropriate modulation scheme, and appropriate optical sensors.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
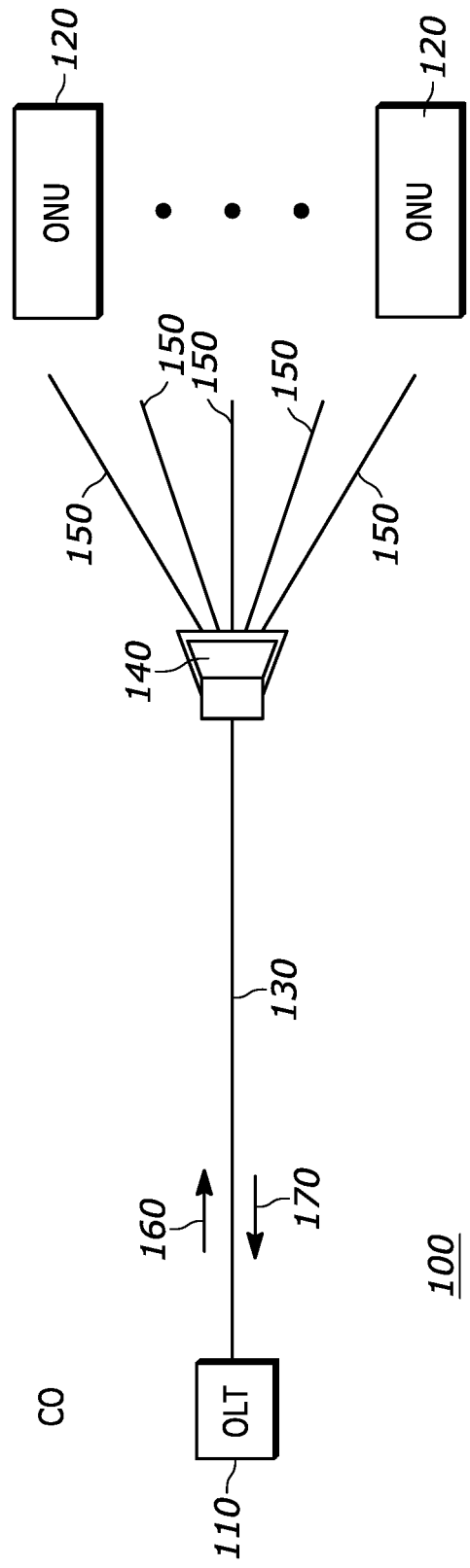
FIG. 1 illustrates an optical access architecture.
Figure 2:
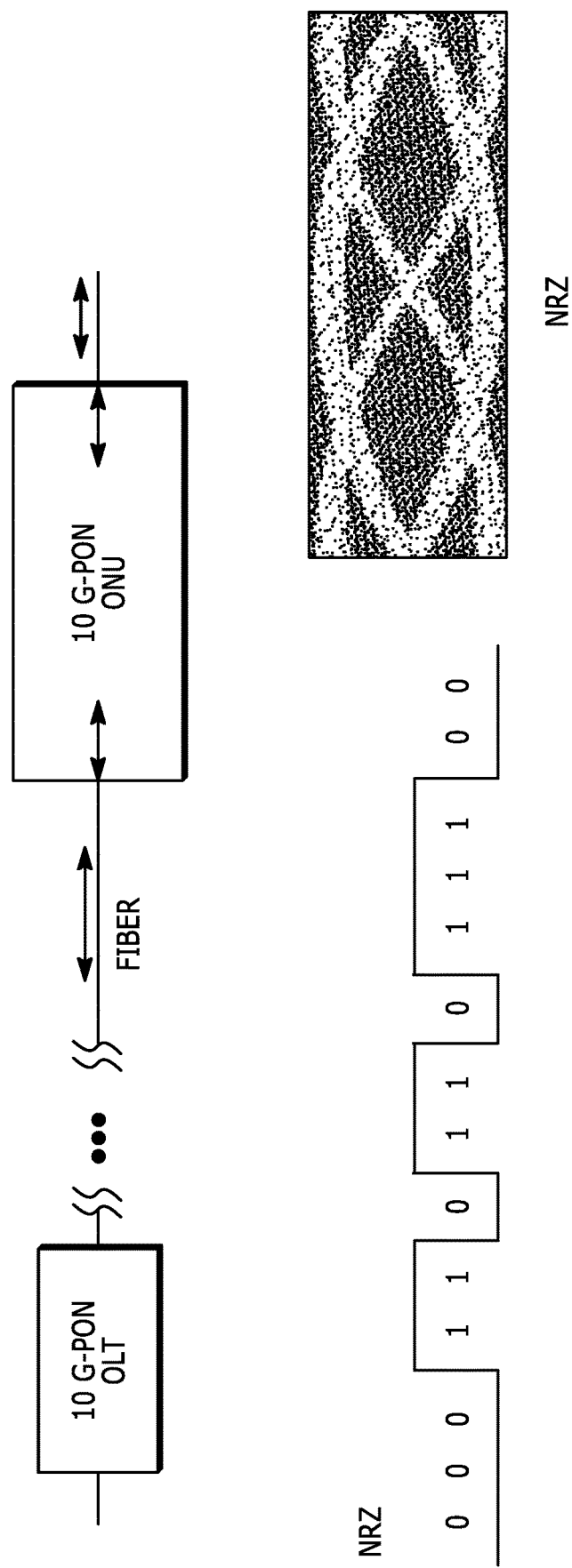
FIG. 2 illustrates a 10G-PON network implementation.

Referring to FIG. 2, one network implementation may include 10G-PON, where the OLT is configured to send and receive 10G-PON signals, and each ONU is configured to send and receive 10G-PON signals. For 10G-PON the data is transmitted as a binary code of 1's and 0's based upon a non-return to zero (NRZ) signaling, where ones are represented by one significant condition (normally a higher value) while zeros are represented by some other significant condition, usually a lower value, with no other neutral or rest condition.

Figure 3:
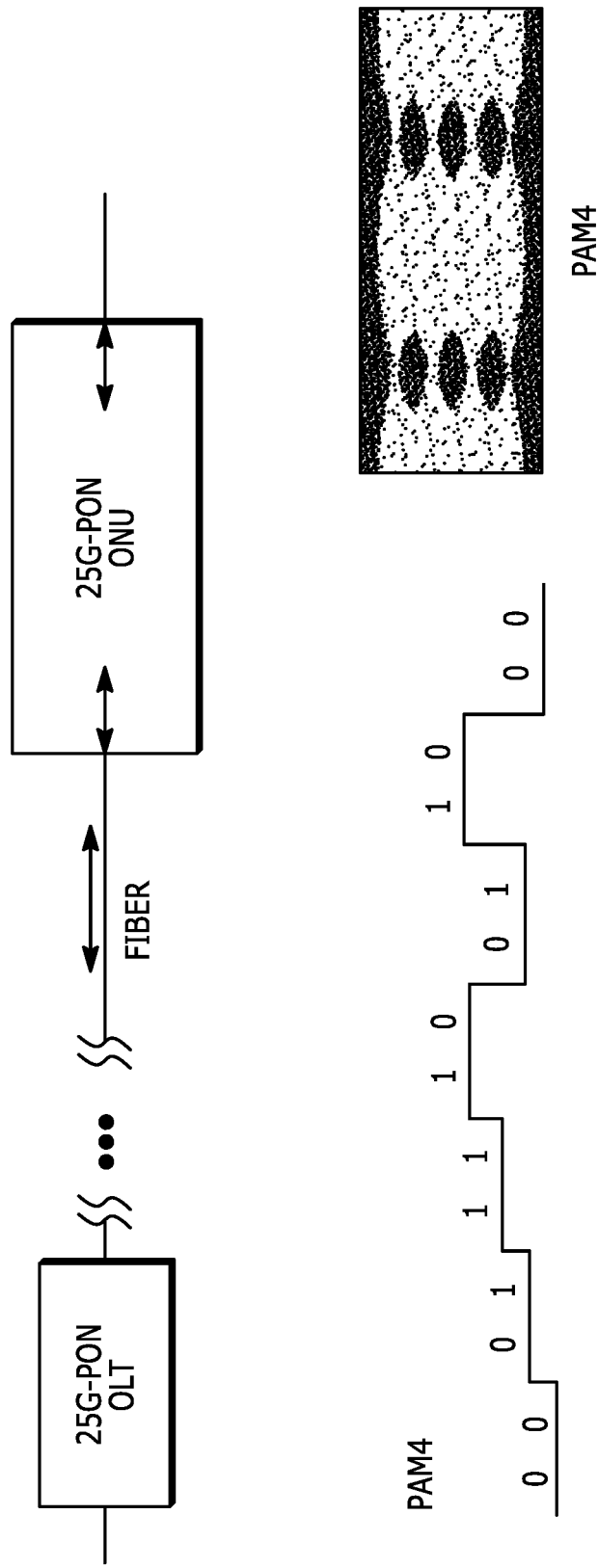
FIG. 3 illustrates a 25G-PON network implementation.

Referring to FIG. 3, one network implementation may include 25G-PON, where the OLT is configured to send and receive 25G-PON signals, and each ONU is configured to send and receive 25G-PON signals. For 25G-PON the data is transmitted as a binary code of 1's and 0's based upon a PAM4 signaling, where the message information is encoded in the amplitude of a series of signal pulses. PAM4 uses four signal levels for transmission, such that within each clock period, where two bits of logic information can be transmitted (i.e., 0,0; 0,1; 1,0; and 1,1). Therefore, under the same rate, the bit rate of a PAM4 signal is twice that of a NRZ signal.

Figure 4:
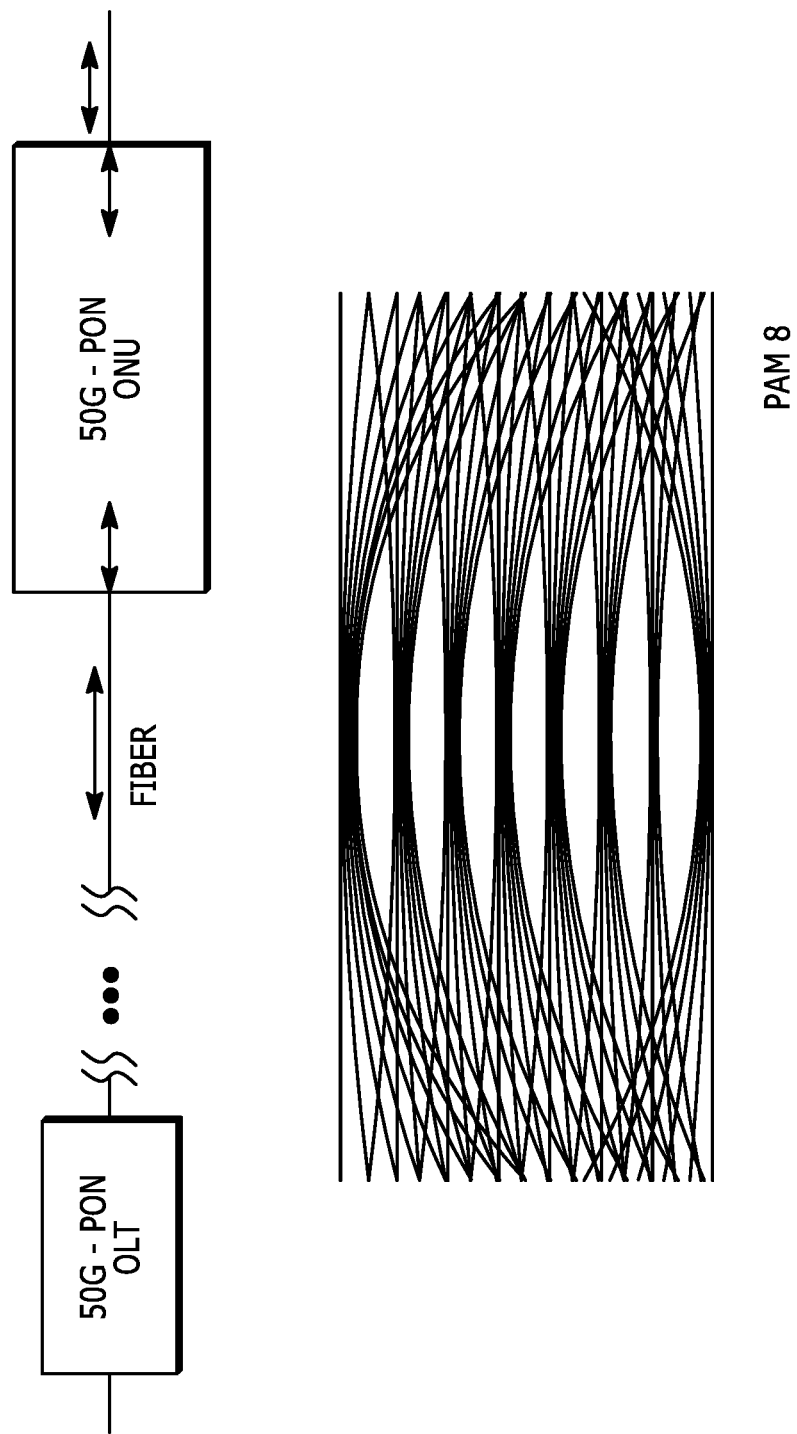
FIG. 4 illustrates a 50G-PON network implementation.

Referring to FIG. 4, one network implementation may include 50G-PON, where the OLT is configured to send and receive 50G-PON signals, and each ONU is configured to send and receive 50G-PON signals. For 505G-PON the data is transmitted as a binary code of 1's and 0's based upon a PAM8 signaling, where the message information is encoded in the amplitude of a series of signal pulses. PAM8 uses eight signal levels for transmission, such that within each clock period, where four bits of logic information can be transmitted (i.e., 0,0,0,0; 0,0,0,1; . . . , 1,1, 1,0; 1,1,1,1). Therefore, under the same rate, the bit rate of a PAM8 signal is twice that of a PAM4 signal. Other pulse amplitude modulation signaling may be used.

It is noted that with each of the different modulation schemes, the timing between bits may stay the same while the throughput of the data is different. Also, the timing between the bits may be changed, if desired. Also, the signal to noise ratio for each of the modulation schemes is different.

In many environments it is desirable to deploy a network architecture that includes 10G-PON, at the OLT and the ONU, because it provides sufficient data throughput at a lower complexity and expense than 25G-PON and/or 50G-PON. Over time as the customers consume increasing amounts of data, it may be desirable to upgrade from 10G-PON to 25G-PON, which traditionally requires changing out the OLT and the ONUs at each customer's premise, which is burdensome for the customer and burdensome for the service provider. Over time as the customers consume increasing amounts of data, it may be desirable to upgrade from 25G-PON to 50G-PON, which traditionally requires changing out the OLT and the ONUs at each customer's premise, which is burdensome for the customer and burdensome for the service provider. As it may be observed, it is burdensome to change out the OLT and/or the ONUs of the network over time, which often involves a service technician arranging to change out the ONUs one at time at each customer's premises. Also, PAM8 signaling is more sensitive to noise than PAM4, which in turn is more sensitive to noise than NRZ. Higher order PAM signaling may likewise be used.

After further consideration, it was determined it would be desirable to include a set of optics within the OLT and/or ONUs where the laser (e.g., light source), the photo diode (e.g., light detector), and its associated optics (e.g., lens) may be reused in a manner that enables the OLT and/or the ONUs to be upgraded based upon controlling software (e.g., firmware) from 10G-PON to 25G-PON and/or 50G-PON, or from 25G-PON to 50G-PON. In this manner, the customer ONU may be upgraded with improved data capacity without the need to replace the customer premise equipment. In this manner, the OLT may be upgraded with improved data capacity without the need to replace the equipment. By way of example, the same optical receiver may be used for the different configurations, such as a positive-intrinsic-negative diode or an avalanche photodiode. In this manner, the same interconnection to the optical fibers may be used for the different configurations. By way of example, the same laser transmitter may be used for the different configurations, such as an indium gallium arsenide based laser.

Figure 5:
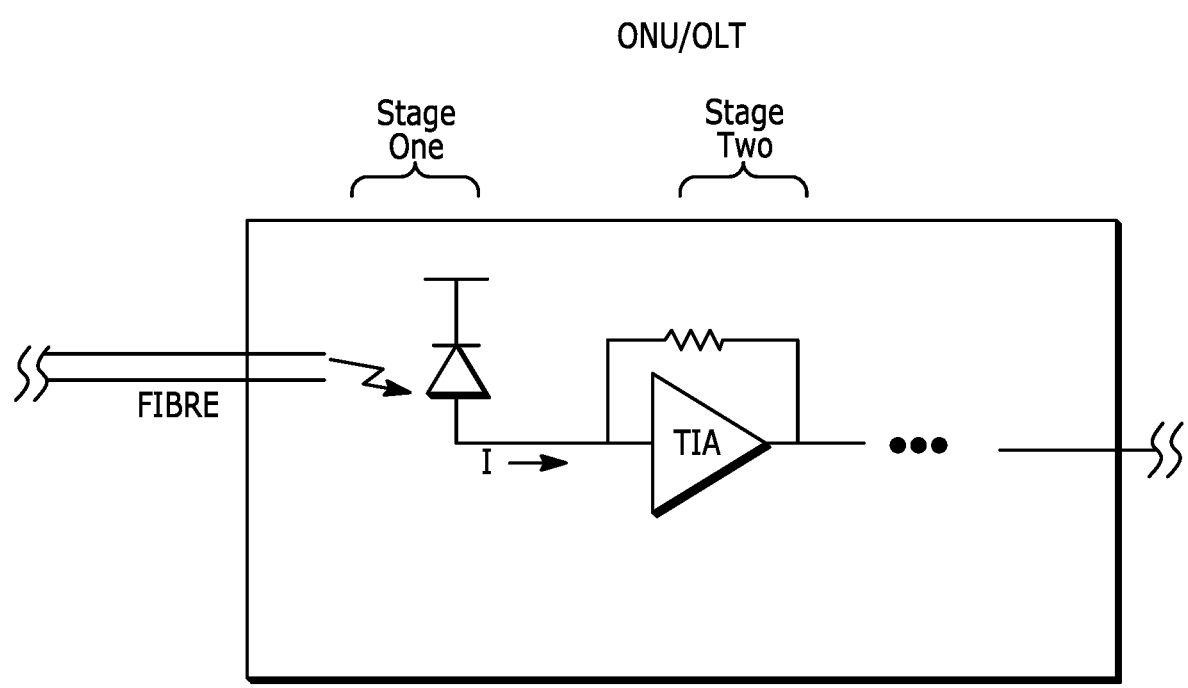
FIG. 5 illustrates two stages of an OLT and/or ONU.

Referring to FIG. 5, the ONU (or OLT) may include a first stage that receives the optical signal from the fiber, such as using a diode. The diode receives the optical signal and in response provides a current output. The ONU may include a second stage that receives the current output from the diode and in response provides a voltage output, such as using a transimpedance amplifier typically implemented using one or more operational amplifiers and/or a current mirror. Accordingly, the two stages of the ONU converts the received optical signal to a corresponding voltage level. The same may be applied to the OLT, as desired. The first and second stages may be combined within a single stage, as desired.

Figure 6:
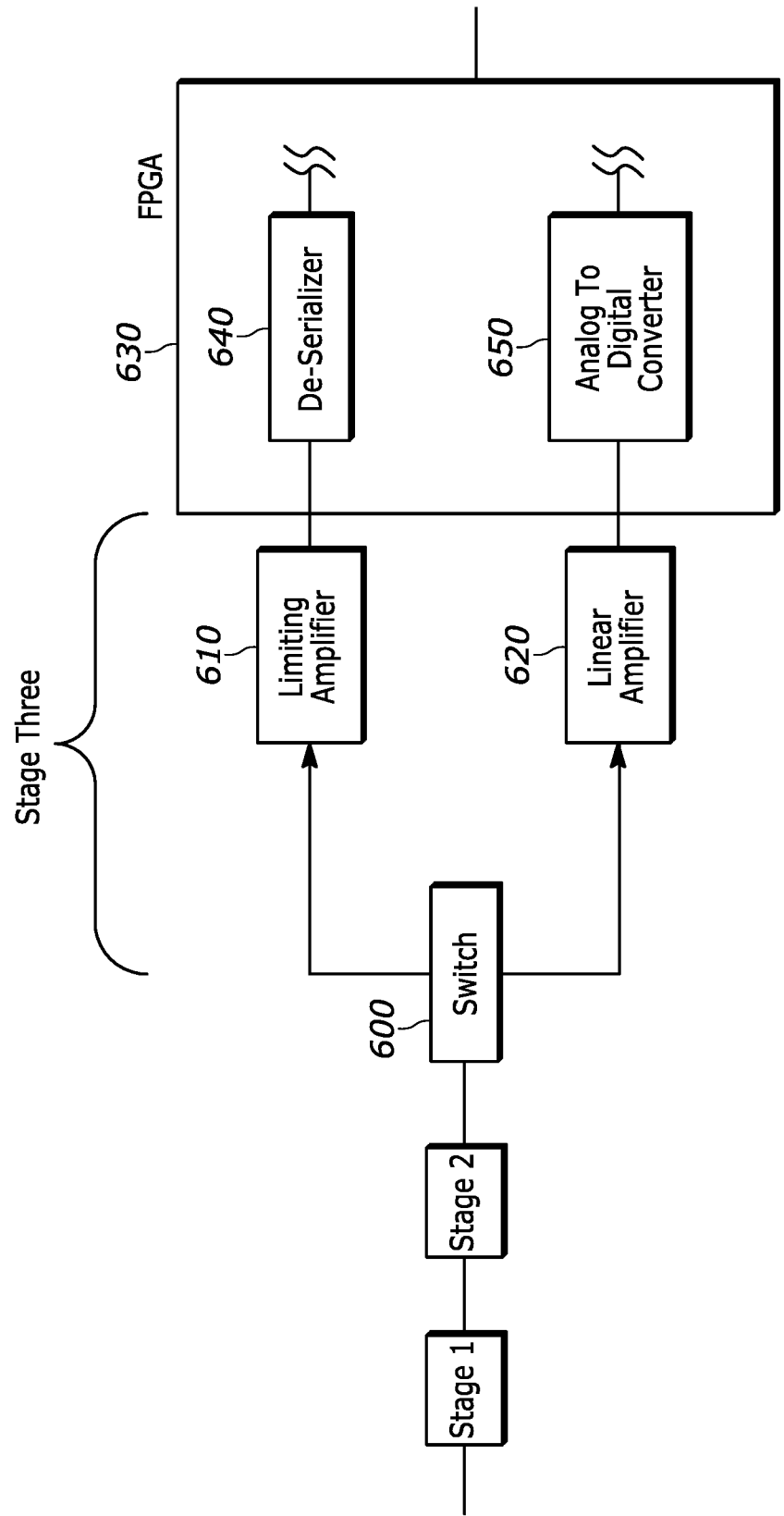
FIG. 6 illustrates three stages and a FPGA of an OLT and/or ONU.
Figure 7:
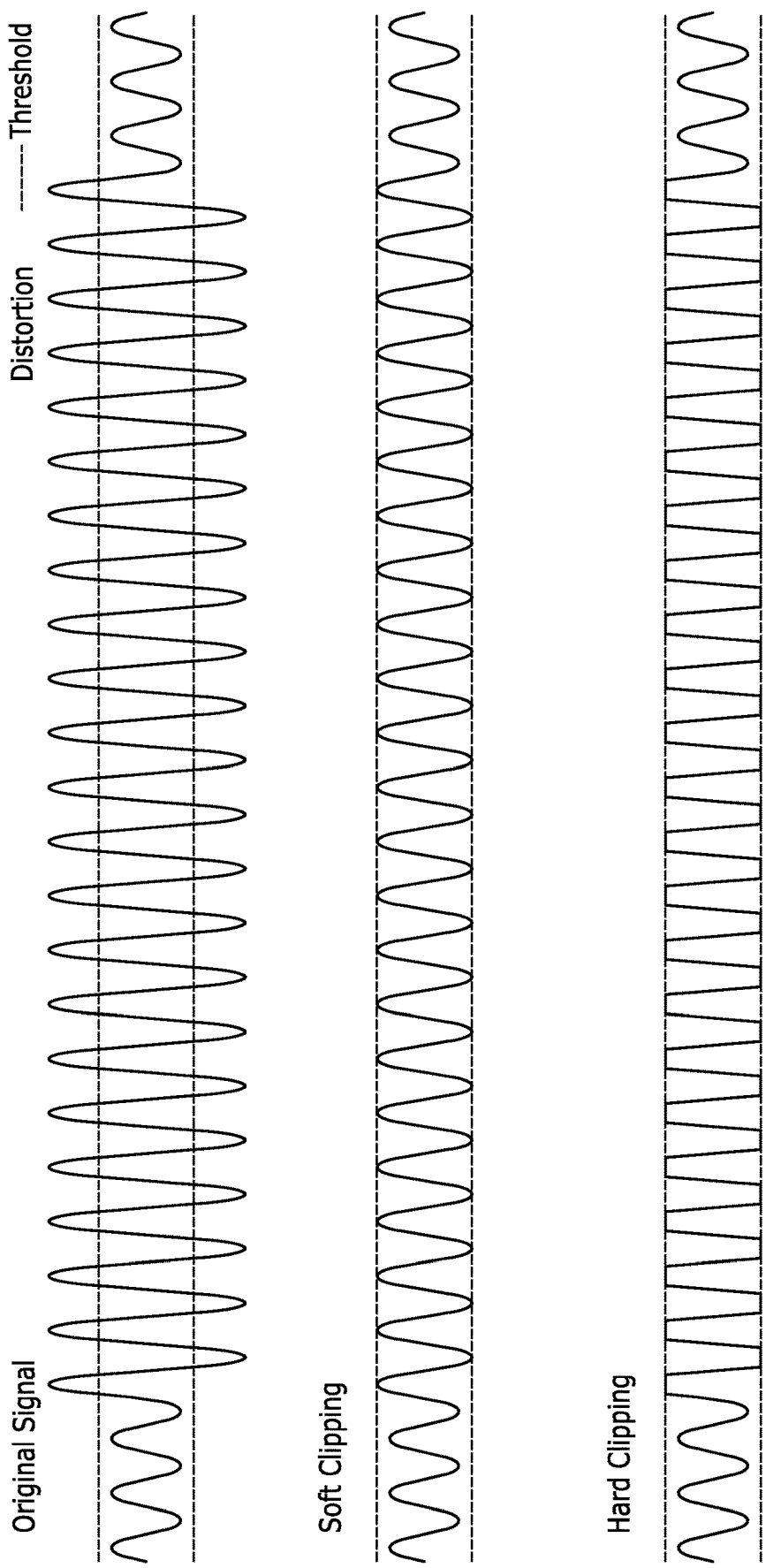
FIG. 7 illustrates a limiting amplifier output.

Referring to FIG. 6, the voltage level from stage 2 tends to be a relatively small signal that should be amplified by a third stage so that it may be more readily processed by a digital processor, such as a field programmable gate array or an application specific integrated circuit. Upon further review, it was determined that signals that are NRZ tend to be generally rectangular and/or sinusoidal in nature to indicate the binary levels, while signals that are PAM4 and/or PAM8 tend to be multi-level in nature to indicate the different values. A switch 600 may be included, such as one that is controllable by software, to provide the output of stage 2 to a different amplification stage based upon the type of signals that are being amplified. For the NRZ signals, the switch 600 sends the voltage signals to a limiting amplifier 610. Referring also to FIG. 7, the limiting amplifier 610 generally allows signals below a level to pass mostly unaffected while attenuating the signals above the level, or also or alternatively, the limiting amplifier 610 generally allows signals above a level to pass mostly unaffected while attenuating the signals below the level, or otherwise those signals in the middle band to pass. In general, the limiting amplifier tends to pass the middle region of the signals while attenuating the upper and/or lower signals. As described, a limiting amplifier has extremely variable and non-linear gain, and this gain may be a function of the amplitude of the input signal. Typically, low amplitude signals see a lot of gain, which increases signal edge rate and "squares up" the signal. Typically, large amplitude signals see effectively way less gain because the limiting amplifier has a maximum high output level and a maximum low output level that it can achieve. For the PAM4 and/or PAM8 signals, the switch 600 sends the voltage signals to a linear amplifier 620 (or substantially linear or non-linear, and more generally a non-limiting amplifier). In general, a linear amplifier maintains the eye pattern of the PAM4 and/or PAM8 signals unlike a limiting amplifier, and a limiting amplifier accentuates the transitions between 0 and 1 of the NRZ signals unlike a linear amplifier.

The output of the limiting amplifier 610 or the linear amplifier 620 is provided to a digital processor 630, such as a field programmable gate array or an application specific integrated circuit, for receiving the input signal, decoding the signal levels, and processing the resulting data. The processor 630 may include a de-serializer 640 that receives the serialized 0's and 1's and forms a set of bytes or otherwise which are parallel in nature. The processor 630 may include an analog-to-digital converter 650 that receives each of the amplitudes of the different levels, converts the level to an associated digital signal, and forms a set of bytes or otherwise which are parallel in nature. Accordingly, when the input signal is switched by the switch 600 between a NRZ signals and a PAM4 and/or PAM8 signal, the FPGA 630 is likewise switched between the de-serializer 640 and the analog to digital converter 650, so that the appropriate signals are processed.

Figure 8:
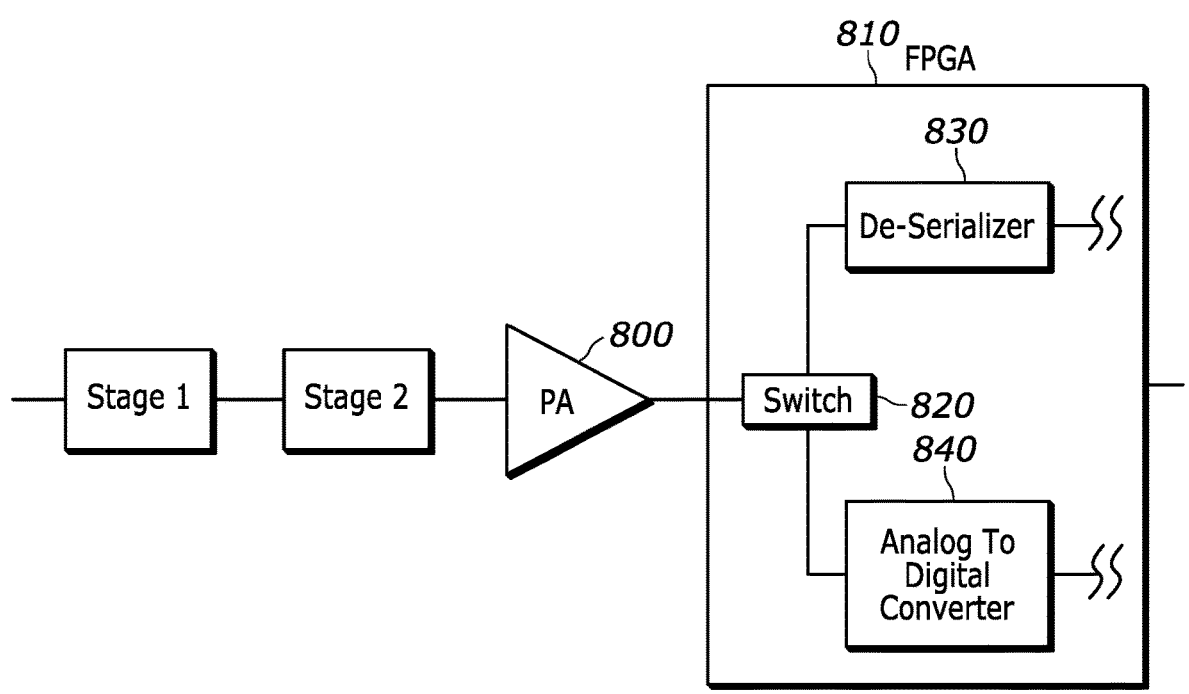
FIG. 8 illustrates another embodiment of a OLT and/or ONU.

Referring to FIG. 8, in another embodiment, the output of stage 2 may be processed by a preamplifier 800 (e.g., linear or non-linear) the output of which is provided to a FPGA 810. The FPGA 810 may include a switch 820 which selectively provides the pre-amplified signals to either a de-serializer 830 or an analog-to-digital converter 840, in a manner akin to FIG. 6.

In another embodiment, a preamplifier may be included together with an analog to digital converter that is used for both the NRZ and the PAM4 and/or PAM8 signaling. In this case, the sensitivity may tend to be lower than desired for the NRZ. Depending on the particular implementation, a link budget that is available for the Optical Distribution Network (ODN) loss, which includes fiber and passive splitting losses, may be sufficient to support lower sensitivity for the NRZ while also supporting the PAM4 and/or PAM8.

The FPGA may include digital processing, that includes a clock recovery, as desired. Further, the OLT may include the same type of configuration as the ONU, described above.

Figure 9:
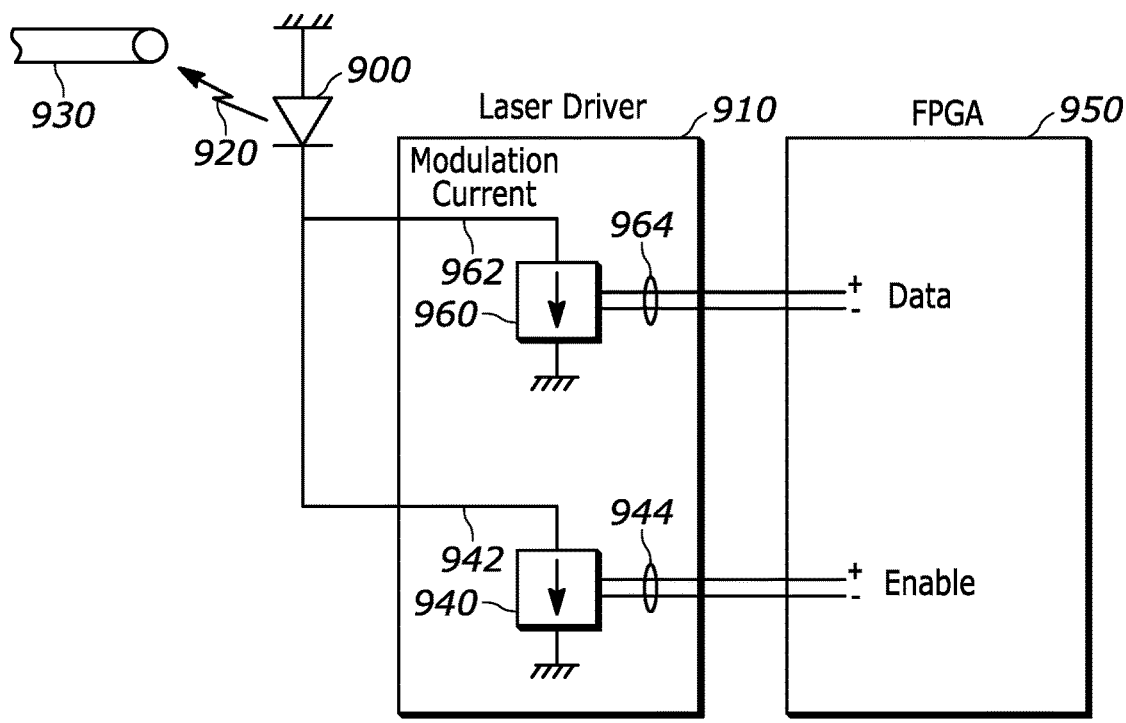
FIG. 9 illustrates a laser and a laser driver.
Figure 10:
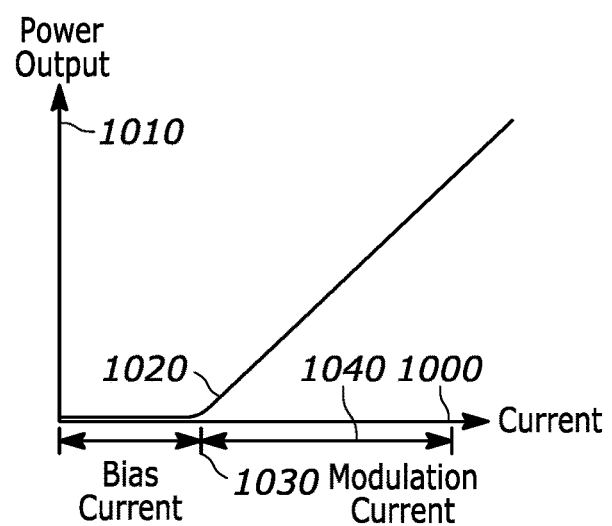
FIG. 10 illustrates a power output of a laser.

Referring to FIG. 9, the OLT and/or the ONU may include a laser 900 together with a laser driver 910 that modulate an optical signal 920 that is transmitted through the optical fiber 930. Referring also to FIG. 10, the laser 900 is operated based upon being provided a current input 1000 which includes a corresponding optical power output 1010 from the laser 900. The response curve of the laser 900 is typically relatively flat until a knee 1020 is reached, corresponding to a bias current level 1030. With a bias current being applied at the bias current level 1030 the output of the laser remains zero or substantially zero. A modulation current 1040 may be selectively provided in addition to the bias current level 1030. With a selected modulation current 1040 being provided a desired power output 1010 may be selected. In this manner, with the bias current "on" and the modulation current "on", a high-power output 1010 is achieve normally referred to as a binary "1". In this manner, with the bias current "on" and the modulation current "off", a lower power output 1010 is achieve normally referred to as a binary "0". Also, with the bias current "off" and the modulation current "off", a lower power output 1010 is achieve normally referred to as a binary "0", though for stable operation often the bias current remains on while optical modulation is occurring.

Referring again to FIG. 9, the laser driver 910 may include a bias current driver 940 that selectively provides a bias current 942 to the laser 900. The bias current driver 940 may be selectively enabled by one or more control signals 944 from the FPGA 950. The laser driver 910 may include a modulation current driver 960 that selectively provides a modulation current 962 to the laser 900. The modulation current driver 940 may be selectively enabled by one or more control signals 964 from the FPGA 950. Based upon the selective enabling of the bias current driver 940 and the modulation current driver 960, a suitable current level may be provided to the laser 900 to modulate the optical signal 920 in a manner to provide a NRZ signal. By way of example, the laser driver 910 may be suitable for 10G-PON.

To provide a multi-level signal, such as one suitable for PAM4 and/or PAM8 signaling, the modulation current driver could be designed to be suitable for providing multiple levels of output. However, including a multi-level current driver tends to require relatively complicated electronics, with the current driver being tuned to provide relatively accurate signal at a plurality of different levels, which is more prone to error than providing a more binary set of outputs.

Figure 11:
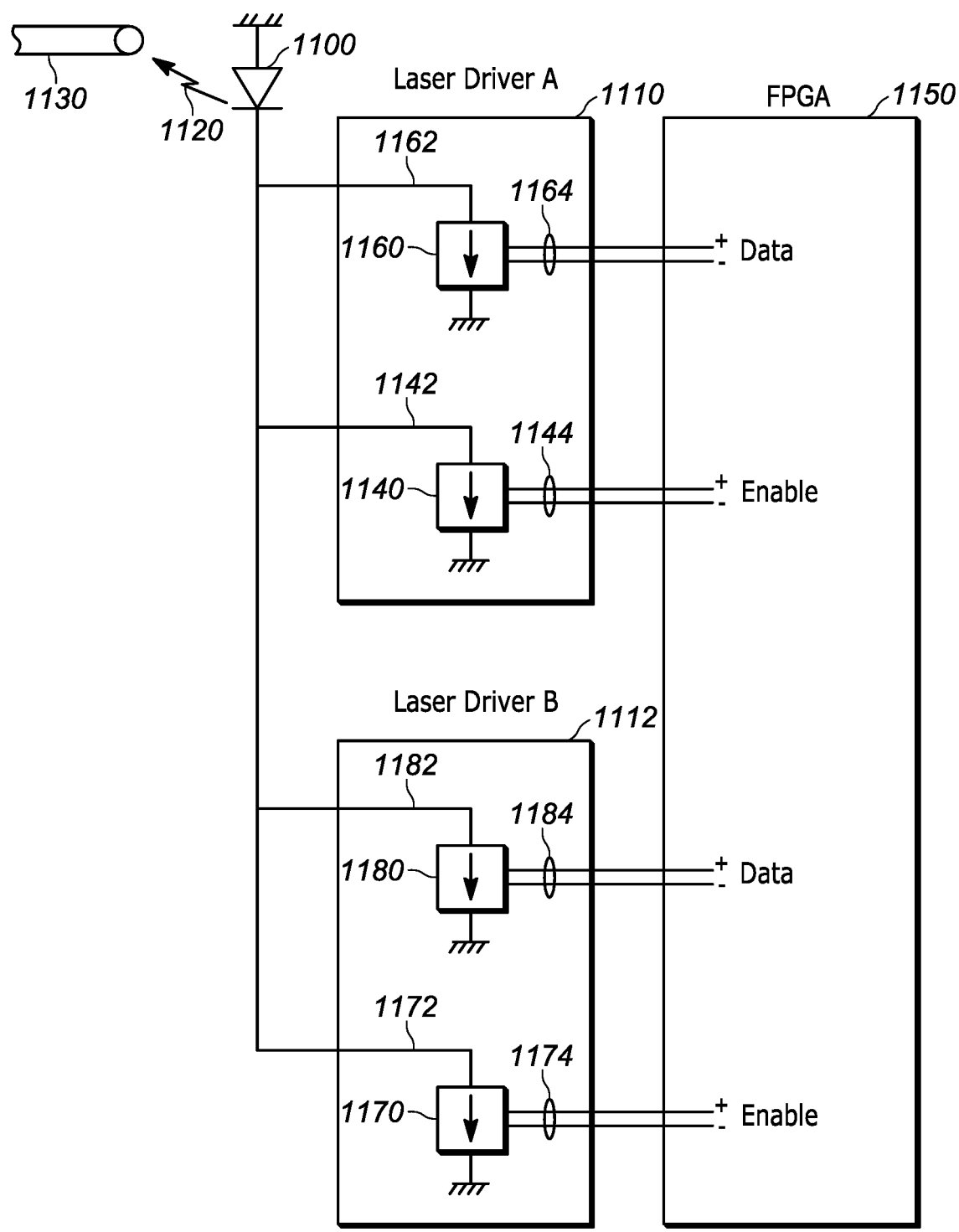
FIG. 11 illustrates a laser and a pair of laser drivers.

Referring to FIG. 11, the OLT and/or the ONU may include a laser 1100 together with a laser driver A 1110 that modulate an optical signal A 1120 that is transmitted through the optical fiber 1130. The laser driver A 1110 may include a bias current driver A 1140 that selectively provides a bias current A 1142 to the laser 1100. The bias current driver A 1140 may be selectively enabled by one or more control signals A 1144 from the FPGA 1150. The laser driver A 1110 may include a modulation current driver A 1160 that selectively provides a modulation current A 1162 to the laser 1100. The modulation current driver A 1140 may be selectively enabled by one or more control signals A 1164 from the FPGA 1150. Based upon the selective enabling of the bias current driver A 1140 and the modulation current driver A 1160, a suitable current level may be provided to the laser 1100 to modulate the optical signal 1120 in a manner to provide a NRZ signal. By way of example, the laser driver A 1110 may be suitable for 10G-PON.

The OLT and/or the ONU may include the laser 1100 together with a laser driver B 1112 that modulate the optical signal 1120 that is transmitted through the optical fiber 1130. The laser driver B 1112 may include a bias current driver B 1170 that selectively provides a bias current B 1172 to the laser 1100. The bias current driver B 1170 may be selectively enabled by one or more control signals B 1174 from the FPGA 1150. The laser driver B 1112 may include a modulation current driver B 1180 that selectively provides a modulation current B 1182 to the laser 1100. The modulation current driver B 1180 may be selectively enabled by one or more control signals B 1184 from the FPGA 1150. Based upon the selective enabling of the bias current driver B 1170 and the modulation current driver B 1180, a suitable current level may be provided to the laser 1100 to modulate the optical signal 1120 in a manner to provide a NRZ signal. By way of example, the laser driver B 1112 may be suitable for 10G-PON.

The FPGA may selectively use either the laser driver A 1110 or the laser driver B 1112 to provide 10G-PON optical signals, with a backup laser driver in the event one of the laser drivers become non-operational. In addition, by the selective use of the laser driver A 1110 in combination with the laser driver B 1112, a set of four different currents may be provided to the laser 1110.

Figure 12:
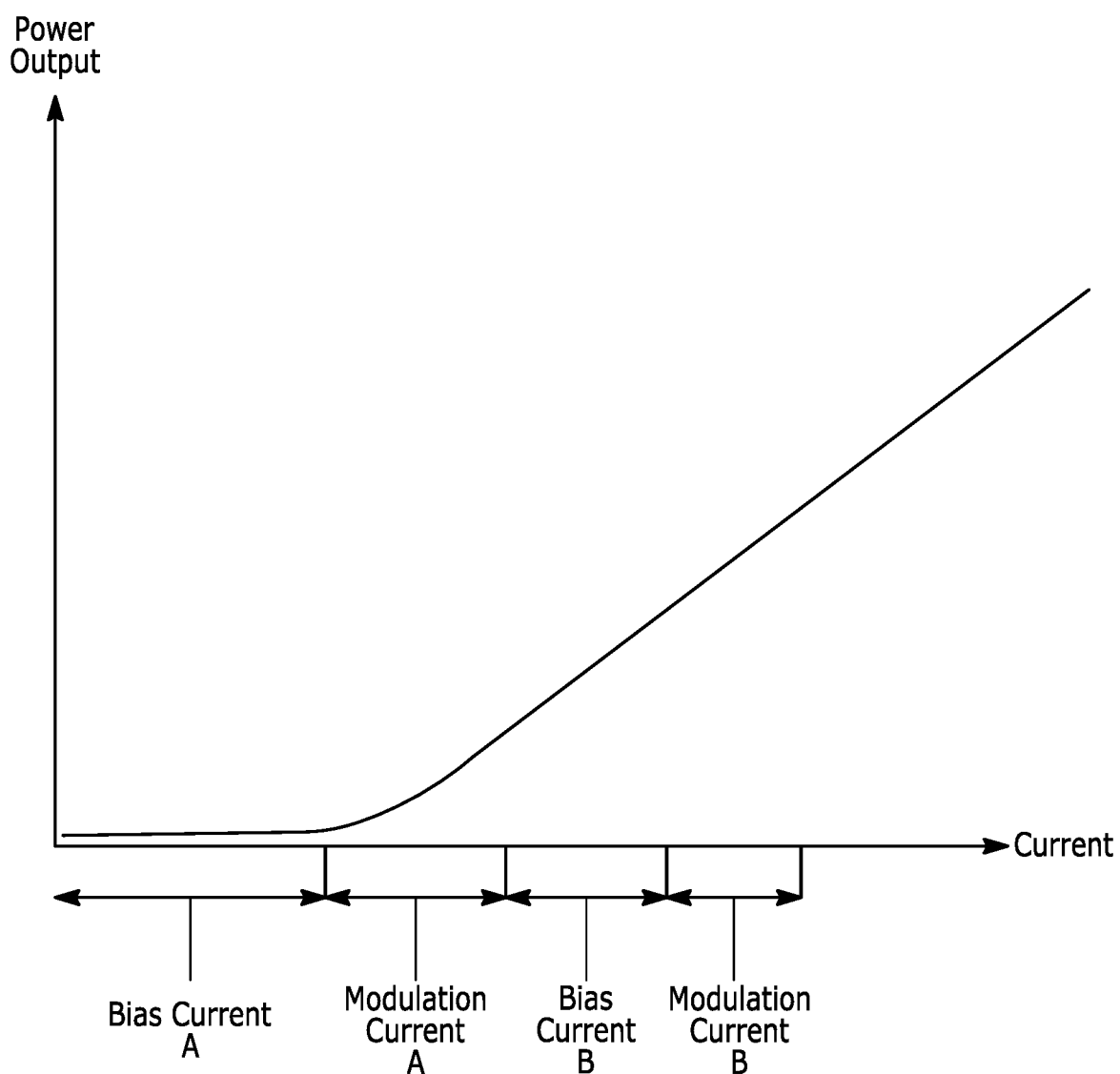
FIG. 12 illustrates another power output of a laser.

Referring also to FIG. 12, the four different currents that may be selectively provided to the laser 1110 include, (1) the bias current A 1142; (2) the modulation current A 1162; (3) the bias current B 1172; and (4) the modulation current B 1182. Various combination of the four different currents levels may be selectively provided to the laser 1110, such as for example, to provide four different output levels from the laser 1110 which in turn provide four different power levels for the optical signal 1120, 0,0 optical signal level:
the bias current A 1142 "on",
the modulation current A 1162 "off",
(3) the bias current B 1172 "off",
(4) the modulation current B 1182 "off".
0,1 optical signal level:
the bias current A 1142 "on",
the modulation current A 1162 "on",
(3) the bias current B 1172 "off",
(4) the modulation current B 1182 "off".
1,0 optical signal level:
the bias current A 1142 "on", the modulation current A 1162 "on",
(3) the bias current B 1172 "on",
(4) the modulation current B 1182 "off".
1,1 optical signal level:
the bias current A 1142 "on",
the modulation current A 1162 "on",
(3) the bias current B 1172 "on",
(4) the modulation current B 1182 "on".

The values of the respective modulation and bias currents are selected so that they provided the desired power output from the laser. For example, the bias current A may be different than the bias current B. For example, the modulation current A may be different than the modulation current B. For example, the bias current A may be different than the modulation current B. For example, the bias current B may be different than the modulation current A. For example, each of the currents may be different than any of the others. Moreover, the selection of the current levels is preferably based upon optical power output profile of the laser, which is especially suitable for a non-linear profile. Additional laser drivers may be included for additional levels of PAM modulation. For example, with three laser drivers PAM8 modulation may be achieved.

Moreover, each functional block or various features in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. An optical network unit for a passive optical network comprising:
   (a) a light sensitive diode suitable to sense light from a passive optical network and provide a first output in response thereto;
   (b) a transimpedance amplifier that receives said first output and provides a second output in response thereto;
   (c) a switch selectively providing said second output to a first amplifier or a second amplifier;
   (d) said first amplifier receiving said second output and amplifying said second output based upon a limiting amplifier to provide a limited amplified output;
   (e) said second amplifier receiving said second output and amplifying said second output based upon a non-limiting amplifier to provide a non-limited amplified output;
   (f) a processor selectively receiving either of said limited amplified output and said non-limited amplified output for subsequent processing;
   (g) wherein said first output is current signal, wherein said second output is a voltage signal, wherein said switch is programmable between said first amplifier and said second amplifier, wherein when said second output is a NRZ signal it is provided to said first amplifier, wherein when said second output is a PAM signal it is provided to said second amplifier, wherein non-limited amplifier is a substantially linear amplifier, wherein an output from said first amplifier is deserialized, wherein an output from said second amplifier is deserialized.

* * * * *